United States Patent [19]
Lee

[11] 4,455,399
[45] Jun. 19, 1984

[54] HETEROGENEOUS RUBBER COMPOSITIONS MADE FROM CHEMICALLY SIMILAR BLENDS

[75] Inventor: Biing-Lin Lee, Broadview Heights, Ohio

[73] Assignee: The B. F. Goodrich Company, Akron, Ohio

[21] Appl. No.: 460,690

[22] Filed: Jan. 24, 1983

[51] Int. Cl.³ ............................................. C08K 3/04
[52] U.S. Cl. ..................................... 523/351; 524/526
[58] Field of Search ......................... 523/351; 524/526

[56] References Cited

U.S. PATENT DOCUMENTS

| | | | |
|---|---|---|---|
| 3,294,720 | 12/1966 | Beber et al. | 523/351 |
| 3,846,371 | 11/1974 | Ro | 523/353 |
| 3,872,036 | 3/1975 | Todani et al. | 523/351 |
| 4,222,906 | 9/1980 | Briggs et al. | 524/322 |
| 4,321,168 | 3/1982 | Veda et al. | 523/351 |
| 4,342,670 | 8/1982 | Ahagon et al. | 523/353 |

FOREIGN PATENT DOCUMENTS 0051450  5/1982  European Pat. Off. .

*Primary Examiner*—Herbert J. Lilling
*Attorney, Agent, or Firm*—James R. Lindsay; Daniel J. Hudak

[57] ABSTRACT

A rubber composition having improved green strength is made by mixing chemically similar blends together and forming a heterogeneous blend. Generally, one of the blends called a minor fraction has a smaller amount of the primary components therein such as rubber and carbon black.

20 Claims, 3 Drawing Figures

HETEROGENEOUS RUBBER COMPOSITIONS MADE FROM CHEMICALLY SIMILAR BLENDS

TECHNICAL FIELD

The present invention relates to rubber compositions made by blending chemically similar rubber compounds together to obtain a heterogeneous rubber composition having improved green strength.

BACKGROUND ART

Heretofore, various elastomers otherwise having low green strength have been improved by adding various types of chemical additives thereto. In other words, at least one additional component was added. Such compositions were homogeneous and substantially uncured.

The present invention is readily distinguished in that a heterogeneous rubber composition is made from chemically similar blends and no other compounds or additives are utilized.

Regarding various different elastomer blends containing carbon black therein, they have been mixed with each other with respect to investigating various chemical and physical properties. For example, an article "Carbon Black Distribution in Elastomer Blends" by Hess, Scott, and Callan, Rubber Chemistry and Technology, pages 371 through 383, Volume 40, 1967, discusses the degree of subdivision of different polymer systems and the distribution of reinforcing filler particles between the phases.

Elastomer Blends, Compatibility and Relative Response to Fillers by Callan, Hess and Scott, page 815-837, Rubber Chemistry and Technology, 1971, relates to zone size variations among different polymer blends, compatibility of butadiene rubber and styrene-butadiene rubber, filler distribution between separate polymer phases as influenced by fundamental polymer and filler characteristics and carbon black transfer.

The article, Effect of Heterogeneous Carbon Black Distribution on the Properties of Polymer Blends by Sircar, Lamond, and Pinter, pages 48-56, Rubber Chemistry and Technology, 1974, relates to comparisons of varying compatibility, for example, styrene-butadiene rubber and polybutadiene rubber, styrene-butadiene rubber and natural rubber, polybutadiene rubber and natural rubber, and polybutadiene rubber and chlorobutyl rubber. Further, the article, Elastomer Blend Properties-Influence of Carbon Black Type and Location, by Hess and Chirico, page 301-326, Rubber Chemistry and Technology, Vol. 50, 1977, relates to the study of various blends of different types of rubber and their performance as affected by carbon black.

Finally, the article Experimental Studies of the Relationship of Processing to the Crack Growth of Carbon-Black-Loaded SBR-Cis-Polybutadiene compounds by Biing-lin Lee, Journal of Applied Polymer Science, Vol. 27, page 3379-3392 (1982), relates to multi-component polymer systems which are blended together to achieve improved results.

However, none of these articles relates to or suggests the blending of any chemically similar or identical compounds to yield different and unexpected results such as improved green strength.

DISCLOSURE OF INVENTION

It is therefore an aspect of the present invention to produce a rubber compound having improved green strength made from chemically similar blends.

It is another aspect of the present invention to produce a rubber compound made from chemically similar blends, as above, wherein said blends produce a heterogeneous rubber compound.

It is another aspect of the present invention to produce a rubber compound made from chemically similar blends, as above, wherein said rubber blends contain different amounts of carbon black.

It is yet another aspect of the present invention to produce a rubber compound made from chemically similar blends, as above, wherein one rubber blend contains a major fraction of rubber, carbon black, and the like, and wherein a second blend contains a minor fraction of rubber, carbon black, and the like.

It is yet another aspect of the present invention to produce a rubber compound made from chemically similar blends, as above, wherein said heterogeneous blend can be made via a one-step route or a two-step route.

It is yet another aspect of the present invention to produce a rubber compound made from chemically similar blends, as above, wherein at least one of said blends contains natural rubber therein.

It is yet another aspect of the present invention to produce a rubber compound made from chemically similar blends, as above, wherein said heterogeneous composition is utilized as in tires for the tire carcass.

These and other aspects of the present invention will become more apparent from the detailed specification set forth hereinbelow.

In general, a process for making a rubber having improved green strength, comprises the steps of: (a) forming a heterogeneous rubber composition comprising by weight approximately 100 total parts of rubber containing at least 30 parts by weight of natural rubber, and from about 30 to about 70 total parts of carbon black, said rubber composition formed by; (b) separately forming a major fraction comprising at least one rubber compound made from monomers selected from the group consisting of (1) conjugated dienes having from 4 to 12 carbon atoms, (2) copolymers made from conjugated dienes having from 4 to 12 carbon atoms and vinyl substituted aromatics having from 8 to 12 carbon atoms, and (3) combinations thereof, said major fraction containing from about 60 to about 90 parts by weight of said rubber, and an amount of said carbon black of from about 20 to about 80 parts by weight; (c) separately forming a minor fraction comprising at least a similar rubber compound as in said major fraction and a carbon black, said minor fraction having from about 10 to about 35 parts by weight of said rubber, and from about 0 to about 20 parts by weight of said carbon black; (d) separately mixing and heating at least one of said fractions; and (e) mixing together under heat said major fraction and said minor fraction to produce said heterogeneous rubber composition.

In general, a heterogeneous rubber composition having improved green strength, comprises: a mixed blend of a major fraction rubber composition and a minor fraction rubber composition forming the heterogeneous rubber composition, said minor fraction having at least a similar rubber compound as in said major fraction, and carbon black; said heterogeneous composition comprising by weight approximately 100 total parts of rubber containing at least 30 parts by weight of natural rubber therein, and from about 30 to about 70 total parts of carbon black; said major fraction comprising at least one rubber compound and a carbon black, said rubber made from monomers selected from the group consisting of (a) conjugated dienes having from 4 to 12 carbon atoms, (b) copolymers made from conjugated dienes having from 4 to 12 carbon atoms and vinyl substituted aromatics having from 8 to 12 carbon atoms, and (c) combinations thereof; said major fraction containing from about 60 to 90 parts by weight of said rubber, and an amount of said carbon black of from about 20 to about 80 parts by weight; said minor fraction comprising a similar rubber compound as in said major fraction and a carbon black, said minor fraction having from about 10 to about 35 parts by weight of said rubber, and from about 0 to about 20 parts by weight of said carbon black.

BEST MODE FOR CARRYING OUT THE INVENTION

Figure 1:
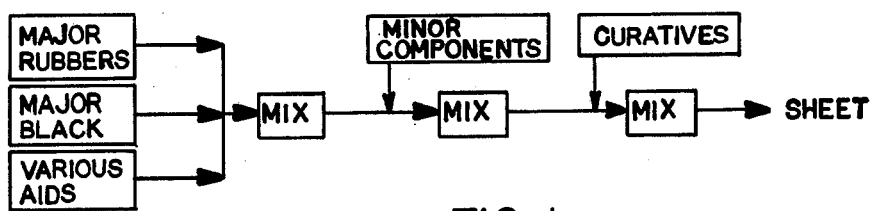
FIG. 1 relates to a schematic diagram of a single step, stagewise addition of ingredients according to the present invention.

The present invention relates to a rubber composition and to a process for making it such that the composition has improved green strength. Green strength can be generally measured by any number of tests. Generally, green strength is most commonly measured as a plot of the force versus the elongation of the particular blend prior to cure. That is, green strength relates to a precure condition wherein the rubber composition has not been cured or fully cured. Thus, various articles can be made and retain their shape, that is, does not collapse during stretching until the article is cured. Natural rubber has good green strength. However, various synthetic rubbers and blends thereof do not have good green strength as does natural rubber.

According to the present invention, chemically similar or identical blends of rubber compounds can be either separately mixed and then blended together to form the final product or composition, or stagewise mixed by adding the minor fraction later during the mixing cycle. It has been unexpectedly discovered that such final composition is a heterogeneous compound having improved properties, for example, green strength. Generally, one of the blends called a major fraction has a large amount of rubbers and carbon black therein. Another blend, called a minor fraction, generally has a low amount of carbon black as well as natural rubber therein in comparison to the amount in the final composition.

Considering the product or final rubber composition, it generally contains one or more rubber compounds with the total amount of rubber being approximately 100 parts by weight. It is important that the final rubber composition as well as the major system or blend and the minor system or blend generally contain natural rubber therein. The total amount of natural rubber is at least 30 parts by weight, desirably at least 50 parts, and preferably 80 parts or greater of the total 100 parts in the final rubber blend. Examples of various other rubbers include those made from conjugated dienes having from 4 to 10 carbon atoms, a copolymer made from conjugated dienes having from 4 to 10 carbon atoms and vinyl substituted aromatic hydrocarbons having from 8 to 12 carbon atoms, and combinations thereof. Examples of various rubbers made from such dienes include synthetic cis-1,4-polyisoprene, natural rubber, cis-polybutadiene, and a styrene-butadiene copolymer. Such elastomers are preferred in the present invention. Examples of other elastomers include those made from 2-methyl-1,3-pentadiene, 4,5-diethyl-1,3-octadiene, and the like. Examples of vinyl substituted aromatic hydrocarbons include styrene, 1-vinyl naphthalene, alpha-methylstyrene, and the like. A highly preferred rubber of the present invention is a copolymer made from styrene and butadiene monomers.

The final product blend or composition contains carbon black in a total amount of from about 30 to about 70 parts per approximately 100 parts of rubber by weight. A desirable amount is from about 40 to about 60 with approximately 50 parts by weight being preferred. Generally, the carbon black can be of any type, that is high surface area, low surface area, high structure type, low structure type, and the like.

As noted, one of the blends is called a minor fraction blend since it generally contains a minor amount of carbon black and rubber, in comparison to the total rubber recipe. With regard to the rubber component, the minor fraction generally contains from about 10 to about 35 total parts of rubber, desirably from about 15 to about 25 parts, and preferably approximately 20 parts by weight. The rubber is natural rubber and can include one or more of the other types of rubber set forth hereinabove. The amount of carbon black in the minor fraction ranges from about 0 or 1 to about 20 parts by weight, desirably from about 5 to about 15 parts by weight, and preferably approximately 7 parts by weight. Generally, any conventional or common type of carbon black can be utilized as well known to those skilled in the art.

The major fraction, like the minor fraction, also contains at least natural rubber, as well as at least one carbon black. Generally, the major fraction will contain usually more than one different type of rubber, that is natural rubber and another rubber, and one or more different types of carbon black. In any event, the major fraction and the minor fraction are similar. By the term similar, it is meant that the minor fraction generally contains natural rubber and perhaps other rubbers and that natural rubber is also generally contained in the major fraction with both fractions containing carbon black. The major fraction and the minor fraction may even be identical, that is for each type of rubber utilized in the major compound, the same type is utilized in the minor compound. However, usually the minor fraction is not identical, but similar in that it contains at least one of the rubbers found in the major fraction, as well as a carbon black compound. It is not important as to whether or not the various types of carbon black compounds, that is for example furnace black, lamp black, etc., are identical.

The major fraction generally contains a total amount of from about 60 to about 90 parts by weight of at least one type of rubber, that is natural rubber, generally from about 75 to about 85 parts by weight and preferably approximately 80 parts by weight. The various types of rubber which may be utilized are the same as set forth above. The major fraction also contains from about 20 to about 80 total parts by weight of at least one type of carbon black, desirably from about 25 to about 55 parts by weight and preferably approximately 42 parts by weight.

The major and minor fractions, which are chemically similar and also may be chemically identical, also contain various other typical and conventional rubber blending compounds or aids. Examples include zinc oxide, various tackifier agents, stearic acid, various antioxidants, various antiozonates, various accelerators, curing agents, and the like. Such compounds can be utilized in conventional amounts. Inasmuch as these various additives or compounding agents are generally conventional and typical, they generally do not form a part of the present invention. Although such compounding aids can be added with both the major and the minor fraction, they are generally added with the major fraction. Typically, the minor fraction only contains at least one type of rubber, that is natural rubber and carbon black.

The major fraction as well as the minor fraction can generally be mixed in any manner such that they are initially mixed separately and then mixed together to produce the heterogeneous blend of the present invention. As apparent from FIG. 1, a so-called one step, stagewise addition mixing process is shown. In this process, the various components of the major reaction including the various blending aids are added to any conventional mixer such as a Banbury and mixed for a short while. To the same mixer is then added the minor components, generally in an unmixed state, and allowed to mix for a short while. The curatives are then added and mixed. Although the major fraction and the minor fraction are chemically similar, when mixed as described herein, a heterogeneous blend is obtained. Depending upon the amount of the minor fraction, it will form either a discontinuous phase or a continuous phase. Such final composition, although being made from chemically similar components, that is a rubber and carbon black, and containing no other non-conventional processing aids, will nevertheless have an unexpected improvement with regards to various properties such as green strength.

Figure 2:
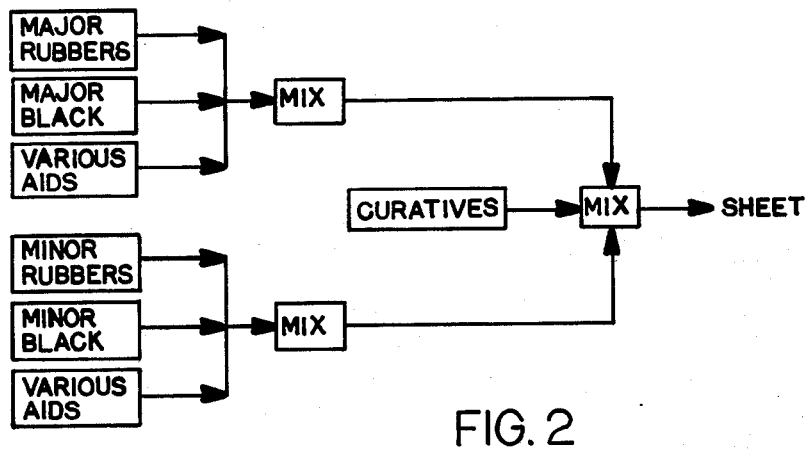
FIG. 2 is a schematic diagram of a two-step mixing procedure.

Another mixing process is shown in the two-step portion of FIG. 2. According to this process, the major fraction contains various amounts of rubber, carbon black, and compounding aids which are then mixed in any conventional mixer such as a Banbury. Similarly, but separately, a minor fraction is made by adding various amounts of rubber, carbon black and processing aids, if any. These ingredients are mixed in any conventional manner as in a Banbury. The blended major fraction and minor fraction are then mixed together along with the curatives for a short period of time in any conventional mixer to yield a heterogeneous blended composition also having an unexpected improvement in various properties including green strength. The minor fraction, depending upon the amount therein, will also be dispersed either as a discontinuous phase or a continuous phase.

Of course, generally, any type of mixing procedure may be utilized so long as the major fraction or minor fraction is separately blended and then added to the remaining fraction. The components of the major fraction as well as the minor fraction can be blended at conventional or typical temperatures, well known to the art, for standard or conventional periods of time. For example, in the one-step method, the major component can be mixed at a temperature ranging from about 180° to about 340° F. and preferably from about 180° to about 240° F. for a short period of time, for example 1 or 2 minutes. The minor components can then be added to the major components and mixed at the same temperature for about two minutes and dumped at a temperature of from about 270° F. to about 340° F. The curatives are then added to this mixture and mixed at about 150° to about 270° F. for about 1 or 2 minutes and dumped at about 240° to about 270° F. Since the mixing can occur in the same mixer, e.g., a Banbury, the process is called a "one-step" process. The mixture or final blended product or composition can then be sheeted as at a temperature of about 150° to about 170° F. for a few minutes on a mill.

In the two-step method, both the major and the minor fractions can be mixed at a temperature of from about 180° to about 340° F. and preferably from about 180° to about 240° F. They can both then be added along with curatives to a mixing device, e.g., a Banbury, at a temperature of approximately 180° to about 340° F., preferably from about 180° to about 240° F. and mixed for 1 or 2 minutes and dumped at a temperature of from about 290° to about 310° F. The final mixture or blend is then sheeted out on a mill. Preferably, the mill temperature ranges from about 150° to about 170° F. Depending upon the specific type of rubbers in use, and the like, such temperatures can naturally be varied as apparent to one skilled in the art. Hence, they are only included herein as a guideline to enable one to make and use the present invention. Moreover, generally any mixing process can be utilized so long as at least one of the fractions is separately mixed before it is mixed with the remaining fraction.

The final composition is final with regard to its composition in that it does not have any further compounds added thereto. However, it can be molded, formed, or otherwise made into a desirable object. For example, specific uses of the final blend of rubber composition made according to the present invention include tires such as passenger tires, truck tires, radial tires, and the like. A specific use within the tire is desirably in the tire carcass, that is the portion of the tire between the tread and the inner liner. When utilized as a carcass material, the amount of natural rubber will range from about 35 to about 45 parts. Naturally, the remaining amount of rubber will be made up of different other types of rubber.

The invention will be better understood by reference to the following examples.

The overall recipe of a control rubber composition made according to the prior art method and the same composition made according to the present invention are set forth in Table I.

TABLE I

| CHEMICAL NAME | CONTROL | MAJOR FRACTION | MINOR FRACTION | CURING AGENT |
| --- | --- | --- | --- | --- |
| Natural rubber | 40 | 20 | 20 | — |

TABLE I-continued

| CHEMICAL NAME | CONTROL | MAJOR FRACTION | MINOR FRACTION | CURING AGENT |
| --- | --- | --- | --- | --- |
| Cis-butadiene rubber | 10 | 10 | 0 | — |
| Synthetic cis-1,4 polyisoprene | 20 | 20 | 0 | — |
| Styrene-butadiene rubber | 30 | 30 | 0 | — |
| Zinc oxide | 3.5 | 3.5 | 0 | — |
| Sulfur | 2.5 | — | — | 2.5 |
| Thiazole accelerator | 0.1 | — | — | 0.1 |
| Tackifier resin | 2.0 | 2.0 | 0 | — |
| Stearic acid | 1.50 | 1.5 | 0 | — |
| Paraffin oil | 9.0 | 9.0 | 0 | — |
| Sulfenamide accelerator | 0.95 | — | 0 | 0.95 |
| Quinoline Anti-oxidant | 0.50 | 0.50 | 0 | — |
| Peptizer | 0.1 | 0.1 | — | — |
| HAF Carbon black | 25.0 | 25.0 | 0 | — |
| Bulk carbon | 25.0 | 18.0 | 7 | — |

The control composition was made in a conventional manner. That is, all of the ingredients with the exception of sulfur, the thiazole accelerator, and the sulfenamide accelerator were added to a Banbury and mixed at 77 RPM. The initial chamber temperature was approximately 200° F. and the dump temperature was approximately 310° F., plus or minus 5° F. After approximately 3 minutes of mixing, the blend was dumped. The curatives, that is the sulfur, the sulfenamide accelerator, and the thiazole were then added to the rubber mix at a temperature of about 150° F. in a Banbury for about 1 to 2 minutes and dumped at a temperature of about 260° F. After cooling, a sheet was molded at 200° F. for 5 minutes and a sample of a ⅛-inch dumbbell was made in accordance with ASTM Standard D-412. A force versus elongation curve was obtained as set forth in FIG. 2.

According to the present invention, the major fraction compounds as set forth in Table I were added to a Banbury. The temperatures and RPM of the Banbury wee the same as set forth above. After 50 seconds of mixing, the minor fraction compounds as shown in Table I, were added. The minor fraction containing the natural rubber and carbon black were mixed for approximately 2½ minutes at 210° F. and dumped at about 300° F. The curatives were added to this rubber mix and mixed in the Banbury at 150° F. for about 1 to 2 minutes and dumped at 260° F. The final blended composition was sheeted out on a mill at 150° F. for about 1 to 2 minutes. The heterogeneous blend was tested in a manner as set forth above. The results are set forth in FIG. 3.

Figure 3:
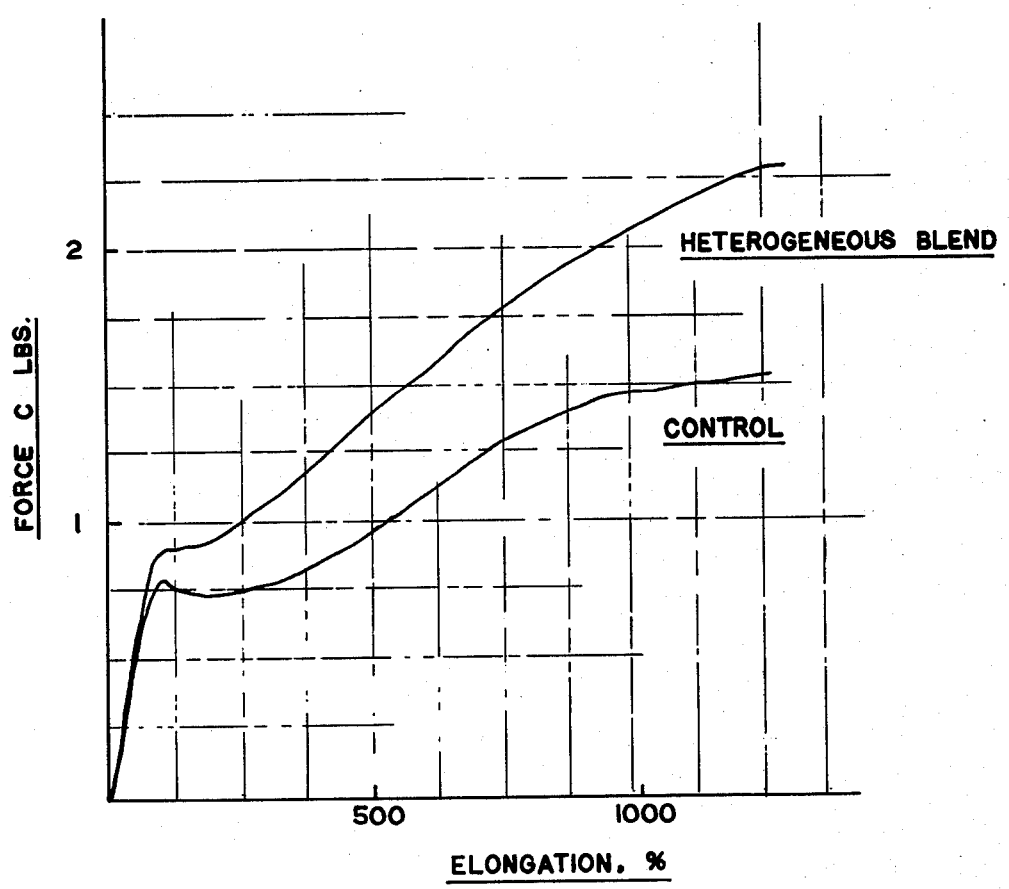
FIG. 3 is a chart showing the force versus elongation curve of a compound of the present invention in comparison to that of a conventionally prepared rubber compound.

As apparent from FIG. 3, the composition made according to the present invention yielded a much improved green strength than the control. Thus, a heterogeneous composition made according to the present invention utilizing a major fraction of pertinent compounds, that is various different types of rubber and carbon black, and a minor fraction of a similar pertinent material, for example, natural rubber and carbon black yielded much improved strength for almost the same elongation. Such compounds are suitable in situations wherein sag, or physical settling is not desired before final cure of the formed item. Such an improvement in properties was unexpected from simply utilizing a minor fraction of similar rubber and carbon black compounds and separately blending such with the major fraction.

It is thus apparent from the above example that applicant's invention relating to a final heterogeneous rubber blend having two phases therein, as well as the process for making the same blend through separate but chemically similar compounding recipes, that is rubber and carbon black, results in improved green strength.

While in accordance with the patent statutes, a best mode and preferred embodiment has been presented, the scope of the invention is set forth by the attached claims.

What is claimed is:

1. A process for making a rubber having improved green strength, comprising the steps of:
   (a) forming a heterogeneous rubber composition comprising by weight approximately 100 total parts of rubber containing at least 30 parts by weight of natural rubber, and from about 30 to about 70 total parts of carbon black, said rubber composition formed by;
   (b) separately forming a major fraction comprising natural rubber and at least one other rubber compound made from monomers selected from the group consisting of (1) conjugated dienes having from 4 to 12 carbon atoms, (2) copolymers made from conjugated dienes having from 4 to 12 carbon atoms and vinyl substituted aromatics having from 8 to 12 carbon atoms, and (3) combinations thereof, said major fraction containing from about 60 to about 90 parts by weight of said rubbers, and an amount of said carbon black of from about 20 to about 80 parts by weight;
   (c) separately forming a minor fraction comprising at least natural rubber and a carbon black, said minor fraction having from about 10 to about 35 parts by weight of said rubber, and from about 1 to about 20 parts by weight of said carbon black;
   (d) separately mixing and heating at least one of said fractions; and
   (e) mixing together under heat said major fraction and said minor fraction to produce said heterogeneous rubber composition.

2. A process according to claim 1, including mixing under heat said major fraction components, adding said minor fraction components to said major fraction components, and mixing under heat to produce said heterogeneous rubber composition.

3. A process according to claim 1, including separately mixing under heat said major fraction components, separately mixing under heat said minor fraction components, adding together said mixed major fraction and said mixed minor fraction component and mixing under heat.

4. A process according to claim 2, wherein said major fraction contains a total amount of rubber of from about 75 to about 85 parts by weight and an amount of carbon black of from about 25 to about 55 parts by weight, and
wherein said minor fraction contains at least natural rubber and another rubber, said other rubber selected from the group consisting of (1) conjugated dienes having from 4 to 12 carbon atoms, (2) copolymers made from conjugated dienes having from 4 to 12 carbon atoms and vinyl substituted aromatics having from 8 to 12 carbon atoms, and (3) combinations thereof, the total amount of said rubbers ranging from about 15 to about 25 parts by weight and an amount of carbon black of from about 5 to about 15 parts by weight.

5. A process according to claim 3, wherein said major fraction contains a total amount of rubber of from about 75 to about 85 parts by weight and an amount of carbon black of from about 25 to about 55 parts by weight, and
wherein said minor fraction contains at least natural rubber and another rubber, said other rubber selected from the group consisting of (1) conjugated dienes having from 4 to 12 carbon atoms, (2) copolymers made from conjugated dienes having from 4 to 12 carbon atoms and vinyl substituted aromatics having from 8 to 12 carbon atoms, and (3) combinations thereof, the total amount of said rubber ranging from about 15 to about 25 parts by weight and an amount of carbon black ranging from about 5 to about 15 parts by weight.

6. A process according to claim 4, wherein said major fraction other than natural rubber is selected from the group consisting of synthetic cis-1,4-polyisoprene, polybutadiene, and styrene-butadiene rubber, and combinations thereof, and
wherein said minor fraction other than natural rubber is selected from the group consisting of synthetic cis-1,4-polyisoprene. polybutadiene, and styrene-butadiene rubber, and combinations thereof.

7. A process according to claim 5, wherein said major fraction other than natural rubber is selected from the group consisting of synthetic cis-1,4-polyisoprene, polybutadiene, and styrene-butadiene rubber, and combinations thereof, and
wherein said minor fraction other than natural rubber is selected from the group consisting of synthetic cis-1,4-polyisoprene. polybutadiene, and styrene-butadiene rubber, and combinations thereof.

8. A process according to claim 6, including mixing said major fraction at a temperature of from about 180° F. to about 340° F., adding said minor components to said major components and mixing at a temperature of from about 180° F. to about 340° F. and adding curatives thereto and mixing at a temperature of from about 150° F. to about 270° F.

9. A process according to claim 7, including mixing said major fraction components at a temperature ranging from about 180° F. to about 340° F., separately mixing said minor fraction components at a temperature of from about 180° to about 340° F., and adding said major fraction, said minor fractions, and curatives together and mixing at a temperature of from about 180° F. to about 340° F.

10. A heterogeneous rubber composition having improved green strength, comprising:
a mixed blend of a major fraction rubber composition and a minor fraction rubber composition forming the heterogeneous rubber composition, said minor fraction having at least a similar rubber compound as in said major fraction, and carbon black;
said heterogeneous composition comprising by weight approximately 100 total parts of rubber containing at least 30 parts by weight of natural rubber therein, and from about 30 to about 70 total parts of carbon black;
said major fraction comprising natural rubber and at least one other rubber compound and a carbon black, said rubber made from monomers selected from the group consisting of (a) conjugated dienes having from 4 to 12 carbon atoms, (b) copolymers made from conjugated dienes having from 4 to 12 carbon atoms and vinyl substituted aromatics having from 8 to 12 carbon atoms, and (c) combinations thereof;
said major fraction containing from about 60 to 90 parts by weight of said rubbers, and an amount of said carbon black of from about 20 to about 80 parts by weight;
said minor fraction comprising at least natural rubber and a carbon black, said minor fraction having from about 10 to about 35 parts by weight of said rubber, and from about 1 to about 20 parts by weight of said carbon black.

11. A heterogeneous rubber composition according to claim 10, wherein said major fraction contains a total amount of rubber ranging from about 75 to about 85 parts by weight and an amount of carbon black of from about 25 to about 55 parts by weight, and
wherein said minor fraction contains at least natural rubber and another rubber, said other rubber selected from the group consisting of (1) conjugated dienes having from 4 to 12 carbon atoms, (2) copolymers made from conjugated dienes having from 4 to 12 carbon atoms and vinyl substituted aromatics having from 8 to 12 carbon atoms, and (3) combinations thereof, the total amount of said rubbers ranging from about 15 to about 25 parts by weight and an amount of carbon black of from about 5 to about 15 parts by weight.

12. A heterogeneous rubber composition according to claim 11, wherein said major fraction other than natural rubber is selected from the group consisting of synthetic cis-1,4-polyisoprene, polybutadiene, and styrene-butadiene rubber, and combinations thereof, and
wherein said minor fraction other than natural rubber is selected from the group consisting of synthetic cis-1,4-polyisoprene, polybutadiene, and styrene-butadiene rubber, and combinations thereof.

13. A heterogeneous rubber composition according to claim 12, wherein said heterogeneous rubber composition is substantially uncured.

14. A heterogeneous rubber composition according to claim 12, wherein said major fraction is separately mixed and said minor fraction is added thereto and mixed.

15. A heterogeneous rubber composition according to claim 12, wherein said major fraction is separately mixed, wherein said minor fraction is separately mixed, and wherein said major and said minor fractions are blended together.

16. A heterogeneous rubber composition according to claim 15, wherein said major fraction and said minor fraction are mixed together at a temperature of from about 180° F. to about 340° F.

17. A heterogeneous rubber composition according to claim 16, wherein said major fraction is separately mixed at a temperature of from about 180° to about 340°

F. and wherein said minor fraction is separately mixed at a temperature of from about 180° to about 340° F.

18. A heterogeneous rubber composition according to claim 14, wherein said major fraction is mixed at a temperature of from about 180° F. to about 340° F., and wherein said minor fraction is mixed with said at a temperature of from about 180° F. to about 340° F.

19. A heteogeneous rubber composition according to claim 12, wherein said major fraction has approximately 80 parts by weight of rubber, and approximately 42 parts by weight of carbon black, and wherein said minor fraction is approximately 20 parts by weight of rubber, and approximately 7 parts by weight of carbon black.

20. A heterogeneous rubber composition according to claim 19, wherein said major fraction has approximately 80 parts by weight of rubber, and approximately 42 parts by weight of carbon black, and wherein said minor fraction has approximately 20 parts by weight of rubber, and approximately 7 parts by weight of carbon black.

* * * * *